United States Patent [19]
Eason

[11] 3,897,829
[45] Aug. 5, 1975

[54] AIRBORNE FIRE SUPPRESSION UNIT

[75] Inventor: Ward R. Eason, McMinnville, Oreg.

[73] Assignee: Evergreen Helicopters, Inc., McMinnville, Oreg.

[22] Filed: May 31, 1973

[21] Appl. No.: 365,426

[52] U.S. Cl. .......... 169/53; 239/280.5; 244/136
[51] Int. Cl. .......................................... A62c 27/30
[58] Field of Search .......... 239/159, 164, 169, 176, 239/280, 280.5, 281, 587, 588, 171; 169/1 R, 2 R, 2 A, 53; 244/136; 220/22

[56] References Cited
UNITED STATES PATENTS

| | | | |
|---|---|---|---|
| 1,147,546 | 7/1915 | Rees | 119/159 UX |
| 2,597,727 | 5/1952 | Hanson | 239/164 |
| 2,857,201 | 10/1958 | Palmer | 239/281 |
| 3,220,482 | 11/1965 | Eveleth | 239/171 X |
| 3,374,916 | 3/1968 | Herff | 220/22 X |
| 3,494,423 | 2/1970 | Stansbury et al. | 239/171 X |
| 3,682,418 | 8/1972 | Harter | 244/136 |
| 3,714,987 | 2/1973 | Mattson | 169/2 A |
| 3,770,060 | 11/1973 | Forsyth et al. | 169/24 |

Primary Examiner—M. Henson Wood, Jr.
Assistant Examiner—John J. Love
Attorney, Agent, or Firm—Chernoff & Vilhauer

[57] ABSTRACT

An airborne fire suppression unit adaptable for installation on an aircraft, particularly a helicopter, for fighting fires in locations inaccessible to other types of fire fighting equipment. The fire suppression unit comprises a fluid reservoir tank mountable on the floor within the aircraft body, a boom assembly having a nozzle mounted thereon adaptable for coupling with the reservoir tank and a motor-driven pump for directing fluid under pressure from the tank to the nozzle, all adapted for rapid detachable mounting to the aircraft. The boom assembly is mountable so as to extend the nozzle laterally from the aircraft, and is rotatably connected at its mounting point so as to reciprocate laterally with respect to the aircraft. The nozzle is pivotally secured to the extended end of the boom to reciprocate in a substantially vertical plane. Manually powered control means operable from within the aircraft regulate the position of the boom assembly and nozzle respectively. A suction conduit coupled with the pump inlet port and adaptable to extend from the helicopter into a body of fluid is provided to permit rapid refilling of the reservoir tank while a fire is in progress. Selectable valve means coupling the pump with the nozzle, tank and suction conduit respectively permit the pump to direct fluid either from the tank to the nozzle for fire-fighting purposes or from the suction conduit to the tank for refilling purposes, or alternatively recirculate the fluid through the tank when neither the nozzle nor suction conduit are being utilized.

19 Claims, 7 Drawing Figures

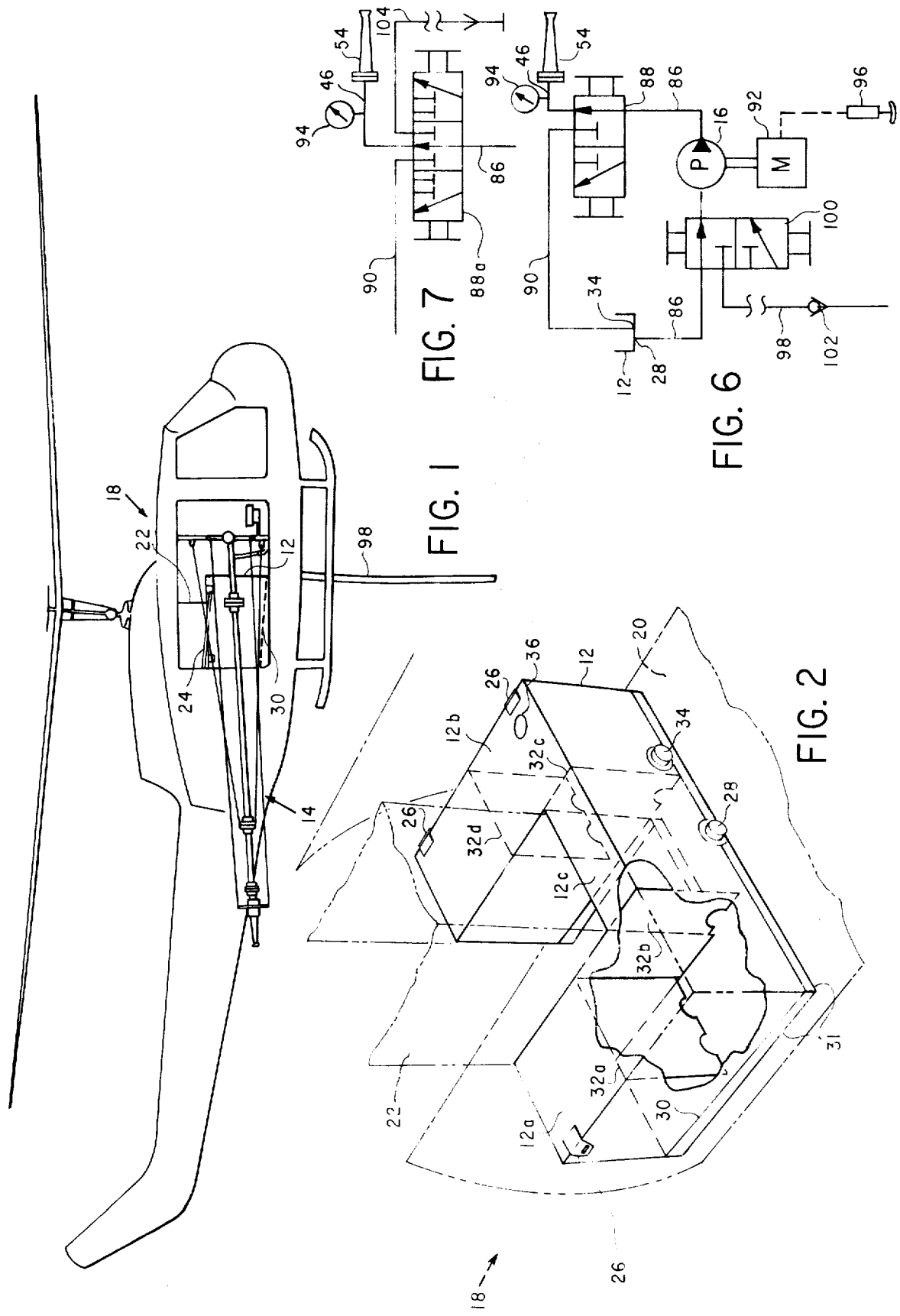

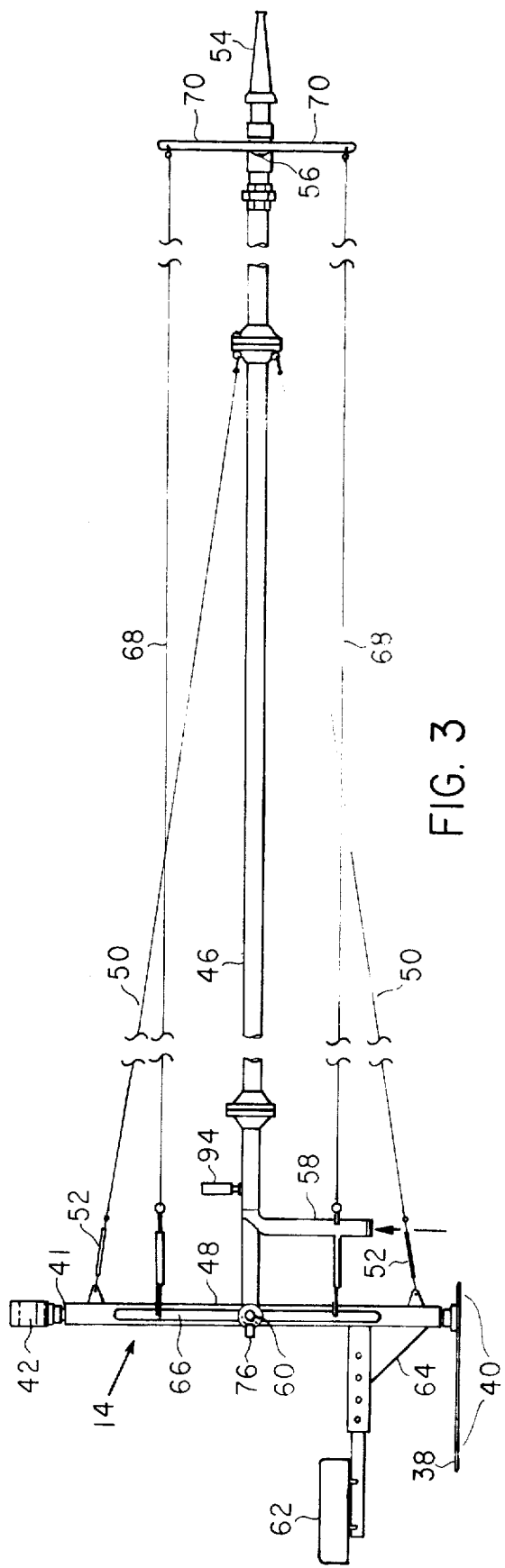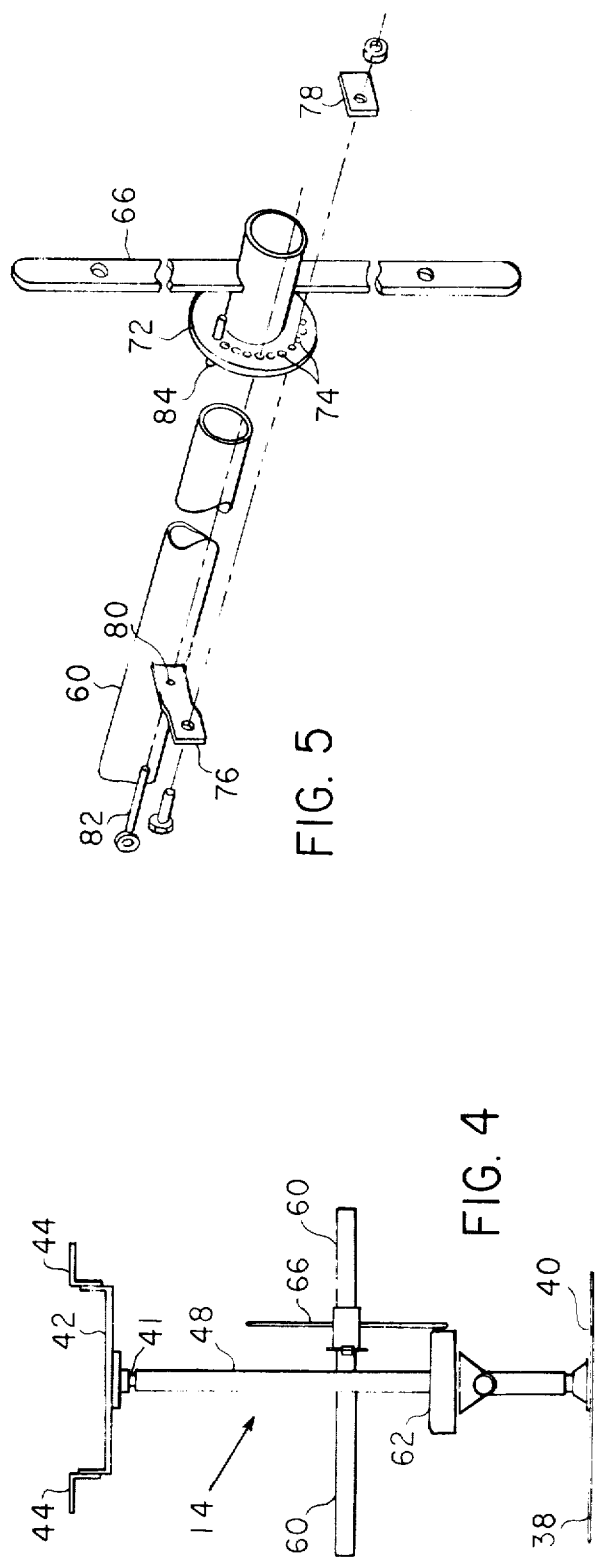

AIRBORNE FIRE SUPPRESSION UNIT

BACKGROUND OF THE INVENTION

This invention relates to improvements in firefighting apparatus of the type adaptable for mounting in aircraft. More specifically the apparatus is of the type comprising a fluid tank adaptable for placement within the body of the aircraft and including a directionally controllable boom-mounted nozzle and motor-driven pump for conducting fluid from the tank to the nozzle, all adaptable for rapid mounting and demounting.

In certain airborne fire suppression units of the type known to the art and shown for example in Eveleth U.S. Pat. No. 3,220,482 and Andrews U.S. Pat. No. 3,273,651, fluid tanks and manually controllable nozzle equipment are suspended beneath the aircraft body. Such systems are designed to permit quick installation and removal of the fire-fighting equipment, which is a highly desirable objective in view of the many other purposes such as cargo and personnel transportation for which the aircraft must also be utilized. Unfortunately such suspended units materially alter the aerodynamic characteristics of the aircraft and, in addition, impede its maneuverability during the fire-fighting process where maneuverability is most critical.

In other types of airborne fire suppression units, such as those shown in Stansbury et al., U.S. Pat. No. 3,494,423 and Gousetis U.S. Pat. No. 3,442,334, the major components of the fire-fighting equipment (the most significant of which from the standpoint of bulk is the fluid reservoir tank) are arranged so as to minimize exterior bulk and attendent reduction in aircraft maneuverability. However by so doing certain sacrifices are made reducing the facility of mounting and demounting of the equipment in the aircraft and limiting the fire-fighting versatility and effectiveness of the equipment itself. For example, in Stansbury many connections and couplings must be attended to in the mounting or demounting of the fire-fighting unit, including the securing of tank support brackets required to provide vertical as well as lateral support for the tanks, bleed air couplings between the tanks and the compressor section of the engine to provide pressure for the system, and servo control connections for effecting powered boom position adjustments during flight. Gousetis is somewhat more compact, but still requires power connections for its three separate pumps and a substantial mounting assembly to provide vertical support for the reservoir tank. In addition the versatility and effectiveness of each system is limited by the fixed vertical angles of the fluid nozzles.

Accordingly a need exists for an airborne fire suppression unit adaptable for installation substantially within the body of an aircraft to maximize the retention of the aircraft's maneuverability and normal aerodynamic characteristics, requiring a minimum of detachable mountings and couplings so as to permit rapid installation and removal of the unit, and having a high degree of nozzle directional control to maximize the unit's fire-fighting versatility and effectiveness.

SUMMARY OF THE PRESENT INVENTION

The present invention is directed to an airborne fire suppression unit of the general type described in which a fluid reservoir tank, pump and boom-mounted nozzle are provided, all adaptable for mounting substantially within the body of an aircraft, with only a minimum number of detachable mounts and couplings being required to make the unit operational. The reservoir tank is adaptable to fit entirely within an interior compartment of the aircraft stably supported by the floor thereof, so that no detachable mounts are needed for vertical support of the tank. In a particular embodiment of the invention intended for installation in a helicopter of the type having a vertical rotor transmission housing within the aircraft compartment, the tank is constructed in a U-shape adaptable for fitting about opposite sides of the housing so as to derive bi-directional lateral support from the housing, thereby further reducing the number of detachable mounts required.

The nozzle for dispensing fluid from the tank is mounted on the extended end of an elongate, laterally reciprocating boom detachably mountable on the aircraft body. Rather than being capable only of lateral directional control however, the nozzle is pivotally attached to the end of the boom so that it can reciprocate upwardly and downwardly in a substantially vertical plane, giving it a degree of directional versatility extremely useful in fighting fires from the air. In addition, manually powered controls are provided for regulating both the lateral position of the boom assembly and the vertical position of the nozzle, with the resultant dual advantages of precise nozzle aiming and elimination of any need for boom servo controls which might otherwise require connection and disconnection during mounting and demounting of the unit, again hindering the rapid installation and removal of the unit.

The inclusion of a fluid pump detachably mountable on the aircraft for supplying fluid from the tank to the nozzle eliminates the need for either a pressurized reservoir tank or the coupling of the fire suppression unit to the aircraft engine. Moreover, in the preferred embodiment of the invention, the pump is driven by its own internal combustion engine which is completely independent of the power system of the aircraft thereby eliminating the need for any power couplings whatsoever. Inasmuch as it is desirable to operate such internal combustion engine continuously during flight so as to avoid the possibility of any delay incident to restarting the engine, approporiate valving and conduits are provided coupling the pump discharge port with the reservoir tank so as to permit the pump to recirculate fluid through the tank when the nozzle is not in use. The pumping system is also provided with a suction conduit adaptable to extend from the aircraft into a body of water and appropriate valve means for permitting the pump to receive fluid from the suction conduit and direct it into the reservoir tank for refilling purposes. This capability is critical for fighting fires in inaccessible areas in that it permits a helicopter to hover above a nearby lake or land adjacent to a stream and take water therefrom through the suction conduit. The suction conduit is equipped with a check valve at its lower end for maintaining prime in the conduit while the aircraft is in flight.

In an alternative embodiment of the invention, a fluid discharge conduit adaptable to extend from a helicopter to a location remote from the helicopter, and valve means for selectively coupling the conduit to the pump discharge port, are provided to enable the helicopter to act as a highly mobile airborne fire hydrant. Firefighters may use the remote end of the conduit to battle fires in locations which are inaccessible to other types of fire-fighting equipment and which, because of overhead obstructions, might also be inaccessible to spray from the boom-mounted nozzle of the fire suppression unit.

Accordingly it is a principal objective of the present invention to provide a new and improved airborne fire suppression unit adaptable for rapid mounting and demounting on an aircraft, particularly a helicopter, so as to maximize the availability of the aircraft both for firefighting and for other purposes.

It is a further important objective of the present invention to provide a highly versatile fire suppression unit capable of directing fire extinguishing fluid not only below but also laterally to and even remote from the aircraft so as to maximize the different types of fires and fire locations for which the unit may be used.

It is a further important objective of the present invention to retain substantially the natural maneuverability and aerodynamic characteristics of the aircraft despite the installation thereon of a fluid reservoir tank of substantial bulk and associated fire-fighting equipment.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is a side elevation view of the fire suppression unit shown mounted in a typical aircraft.

FIG. 2 is a perspective view of the fluid reservoir tank shown mounted within a helicopter compartment (the pertinent portions of which are shown in phantom), with portions of the tank removed to show inner construction.

FIG. 3 is an extended side elevation view of the boom assembly and nozzle of the fire suppression unit.

FIG. 4 is an end view of the boom assembly.

FIG. 5 is an enlarged exploded view of the nozzle manual control lever and associated variable locking elements.

FIG. 6 is a schematic diagram of the fluid pumping system of the fire suppression unit.

FIG. 7 is a partial schematic diagram of an alternative embodiment of the fluid pumping system.

DESCRIPTION OF THE PREFERRED EMBODIMENT

The airborne fire suppression unit of the present invention comprises a fluid reservoir tank 12, a boom assembly indicated generally as 14 and a fluid pump 16 (FIG. 6), the latter being coupled by appropriate fluid conduits and valving to the tank and boom assembly respectively in a manner to be described hereafter.

With reference to FIGS. 1 and 2, the fluid reservoir tank 12 is adaptable to be detachably mounted within an interior compartment of an aircraft 18, preferably a helicopter, supported vertically by the floor 20 of the compartment. The specific type of aircraft for which the preferred embodiment of the fire suppression unit is especially adaptable, i.e. a Bell model 205A or 205A-1 helicopter, has a vertically situated rotor transmission housing 22 located within the interior compartment. Accordingly the tank 12 is preferably of a U-shape adaptable for fitting about opposite sides of the rotor transmission housing 22 so as to derive bidirectional lateral support therefrom. Regardless of the type of aircraft utilized, however, the tank 12 should be adapted for mounting stably on an interior compartment floor 20 so as to minimize the number of detachable mounts necessary to secure and hold the tank in place during flight and to retain the exterior configuration of the aircraft substantially unchanged.

In the embodiment of FIGS. 1 and 2, with all vertical tank support being supplied by the floor 20 and all lateral and aft support being supplied by the rotor transmission housing 22, the only detachable mounts required for the tank 12 are those restraining the tank against forward movement. Such restraint is supplied by respective tension members 24 (FIG. 1) located on either side of the tank 12 and extending between hardpoints on the rear wall of the aircraft compartment and respective clips 26 secured to the sides of the tank. As a further precaution, hold-down straps may be connected between the clips 26 and hardpoints on the floor 20 if desired.

The two side portions 12a and 12b of the tank 12 are coupled by means of a transverse portion 12c with a drain port 28 through which the contents of the tank are discharged in a manner to be described hereafter. Inasmuch as the normal attitude of the aircraft 18 during flight may be such that the floor 20 slants rearwardly, the tank 12 is equipped with an inclined bottom 30 supported by peripheral flanges 31 so as to slant forwardly at an angle with the floor 20, thereby insuring that the fluid in the tank will flow toward the drain port 28. The cavity formed between the tank bottom 30 and compartment floor 20 is preferably filled with a foam-in-place urethane insulation. A group of interior baffles 32a,b,c and d are provided within the tank for preventing the abrupt transfer of fluid from one tank portion to another upon momentary changes of attitude of the aircraft, so as to stabilize the location of the center of gravity of the fluid during flight and thereby help to maintain the normal handling characteristics of the aircraft 18. The tank 12 is also equipped with a filler port 34 through which fluid may be pumped into the tank 12, and fill caps such as 36 on either side of the tank for normal filling on the ground.

With reference to FIGS. 3–5, the boom assembly 14 comprises a mounting plate 38 having a series of spaced apertures 40 formed therein adaptable for aligning with and securing to hardpoints on the compartment floor 20 of the aircraft 18. A vertical post 41 extends from the mounting plate 38 upwardly, terminating in an overhead mounting bracket 42 having a pair of flanges 44 adaptable for bolting to the ceiling of the compartment. An elongate boom 46 has a sleeve 48 fixed at one end thereof for fitting loosely over the post 41, thereby permitting the boom 46 to extend laterally from the side of the aircraft 18 and reciprocate laterally about the post 41. A pair of cables 50 secured tautly by turnbuckles 52 between the sleeve 48 and the boom 46 help to support the boom laterally.

A nozzle 54 is mounted on the extended end of the boom 46 by means of a pivotal joint 56 which permits the nozzle to reciprocate upwardly and downwardly in a plane substantially perpendicular to that in which the boom 46 reciprocates laterally about the post 41. Fluid from the reservoir tank 12 reaches the nozzle 54 by entering the boom assembly through a fluid coupling pipe 58 and traveling through the hollow boom tube 46 to the nozzle 54.

The lateral position of the boom assembly 14 with respect to the aircraft is controllable manually by virtue of a pair of handles 60 secured to the sleeve 48 and extending transversely therefrom. In addition, an operator's seat 62 is adjustably fastened by means of a bracket 64 to the sleeve 48 in alignment with the boom 46 so as to reciprocate laterally about the post 41 in unison with the boom assembly. Accordingly, if the operator's hands are required for purposes other than operating the transverse handles 60, he may still control and maintain the lateral position of the boom assembly by virtue of his position on the operator's seat 62.

Vertical positioning of the nozzle 54 is accomplished by means of a manually operable control lever 66 journaled to one of the handles 60 and coupled by means of a pair of cables 68 to a pair of arms 70 extending from the nozzle 54 at the pivotal joint 56. The operator, stationed on the seat 62, pulls the top portion of the lever 66 toward himself to elevate the nozzle 54 or, alternatively, pushes the top portion away to depress the nozzle.

A circular flange 72 (FIG. 5) having a series of transverse apertures 74 formed therein is fixed to the lever 66 so as to rotate with the lever about the handle 60. In operation, the flange 72 is sandwiched loosely between a bracket 76 fixed to the handle 60 and a retainer 78 bolted to the bracket 76. An aperture 80 is formed in the bracket 76 so as to align with any one of the apertures 74, depending on the position of the lever 66, and a pin 82 is provided for insertion through the aligned apertures to lock the lever 66 in any one of various positions so as to eliminate the need for continuous operator control of the nozzle 54. It is desirable, in the preferred embodiment of the fire suppression unit adaptable for use with a helicopter, that the maximum elevation of the nozzle 54 be controlled so as to prevent fluid spray from impinging on the helicopter's rotor blades. Accordingly a fixed stop pin 84 is secured at a predetermined location on the flange 72 so as to abut against the top of the bracket 76 and thereby prevent the upward elevation of the nozzle 54 to a point where spray would strike the blades.

With reference to FIG. 6, the pumping system of the fire suppression unit comprises a fluid pump 16 detachably mountable by any convenient means on the aircraft 18 and interposed in a conduit 86 which couples the nozzle 54 with the drain port 28 of the reservoir tank 12. A manually operable valve 88 interposed between the discharge port of the pump 16 and the nozzle 54 selectively permits fluid to be directed either to the nozzle 54 or to a second fluid conduit 90 coupled to the filler port 34 of the reservoir tank 12. Depending upon the position of valve 88, the fluid may either be directed from the tank 12 to the nozzle 54 or, alternatively, recirculated back to the tank 12 through the conduit 90. The recirculation feature is particularly useful in the preferred embodiment of the invention wherein the motor 92 which drives the pump 16 is a small internal combustion engine completely independent of the power system of the aircraft 18. The recirculation capability permits the pump and thus the engine 92 to run continuously, whether or not the nozzle 54 is in use, thereby eliminating any delays which might otherwise occur incident to stopping and restarting the engine 92.

A pressure gauge 94 (FIGS. 3 and 6) coupled to the boom conduit 46 measures the pressure of the fluid supplied to the nozzle 54. The pressure gauge is mounted adjacent the operator's station 62, as is a remote throttle 96 for controlling the power output of the engine 92. The operator receives an indication from the pressure gauge 94 of the approximate relative volumetric flow through the nozzle 54 and, by adjusting the throttle 96, may alter such volumetric flow if desired. Alternatively the gauge 94 may serve to indicate any threat of stalling by the engine 92, in which case the operator may adjust the throttle 96 accordingly to increase engine power.

Because of the intended use of the fire suppression unit in remote areas, the pumping system is preferably provided with a suction conduit 98 adaptable to extend from the aircraft into a body of water such as a lake or stream, for refilling the tank 12 while a fire is in progress. A manually operable filler valve 100 selectively connects the suction line 98 with the inlet port of the pump 16 while simultaneously interrrupting flow from the drain port 28 of the tank 12 to the pump 16. Accordingly, with the inlet port of pump 16 coupled by valve 100 with suction line 98, and the discharge port of the pump coupled by valve 88 with conduit 90, the tank 12 may be rapidly refilled from the body of water. The suction conduit 98 is preferably equipped with a check valve 102 at its extended end so as to prevent the flow of fluid through the conduit in a direction away from the pump and thereby maintain prime in the conduit. This feature helps to insure rapid refilling of the tank, particularly when the suction conduit must depend from a hovering helicopter into a lake or other body water during the refilling process.

In an alternative embodiment of the pumping system shown in FIG. 7, a valve 88a replaces the previous valve 88 and includes a third selective position whereby fluid may be conducted from the pump 16 to a long fluid discharge conduit 104 adaptable to extend from the aircraft 18 to a location remote therefrom. This feature enables the aircraft 18 either to hover above a fire or land proximate thereto and supply pressurized fluid to firemen who may use the extended conduit 104 as a fire hose for extinguishing otherwise inaccessible fires.

Although water will normally be stored in the tank 12 for suppressing most fires, particularly forest and brush fires, the use of fire extinguishing chemicals mixed with the water may be desirable. Moreover for certain fires, specifically petroleum based fires, other appropriate types of fire extinguishing fluids are contemplated.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In an aircraft, a fire suppression unit comprising in combination:

a. a tank for holding a fire extinguishing fluid;

b. means for mounting said tank to said aircraft;

c. a fluid-dispensing nozzle coupled by fluid conduit means to said tank;

d. an elongate boom assembly and boom mounting means adjacent one end thereof for securing said boom assembly to said aircraft in a position so as to extend the other end of said boom assembly laterally from said aircraft, said mounting means being attached to said aircraft at respective locations above and below said boom assembly and including means for permitting said boom assembly to reciprocate laterally about said mounting means;

e. means for mounting said nozzle to the extended end of said boom assembly including pivotal means for permitting said nozzle to reciprocate about said extended end of said boom assembly in a plane substantially perpendicular to the plane of said lateral reciprocation of said boom assembly; and f. control means operable from within said aircraft for regulating the lateral position of said boom assembly with respect to said aircraft and also for regulating the pivotal position of said nozzle with respect to said boom assembly.

2. The airborne fire suppression unit of claim 1 wherein said control means includes a manually operable control lever pivotally secured at a location adjacent the mounted end of the said boom assembly and coupled with said nozzle by force-transmitting means for regulating the pivotal position of said nozzle in response to the position of said control lever.

3. The airborne fire suppression unit of claim 2 wherein said lever includes adjustable means for locking said lever in variable positions so as to thereby lock said nozzle in corresponding variable position.

4. The airborne fire suppression unit of claim 1 wherein said control means includes a pair of handles extending transversely from said boom assembly adjacent its mounted end for permitting manual control of the lateral position of said boom assembly.

5. The airborne fire suppression unit of claim 1 including an operator's seat and means for securing said seat to said boom assembly so as to cause said seat to reciprocate laterally in unison with said boom assembly about said boom mounting means, said operator's seat being sufficiently proximate to said control means to allow an operator seated thereon to actuate said control means.

6. The airborne fire suppression unit of claim 1 wherein said aircraft for which said unit is adapted is a helicopter, and wherein said control means includes stop means for preventing the upward elevation of said nozzle to a point where the fluid spray therefrom would strike said helicopter's rotor blades.

7. In an aircraft having an interior compartment with side walls and a floor forming the bottom of said compartment, a fire suppression unit adapted for rapid mounting and demounting within said compartment comprising in combination:

a. a boom assembly detachably mounted to said aircraft and having a fluid dispensing nozzle mounted thereon, said boom assembly including movable means for permitting variations of the direction of said nozzle with respect to said aircraft and further including control means operable from within said interior compartment for controllably adjusting said nozzle direction;

b. pump means detachably mounted on said aircraft for supplying a flow of fluid to said nozzle; and c. a fluid reservoir tank coupled with said pump and removably mounted within said interior compartment of said aircraft, said tank including exterior surface means of a size and shape at least partially corresponding matingly with the interior size and shape of said compartment for deriving multi-directional horizontal support from the walls of said compartment and vertical support from said compartment floor by abutment with said walls and floor respectively.

8. The airborne fire suppression unit of claim 7 wherein the aircraft for which said fire suppression unit is adapted is a helicopter having a vertically situated rotor transmission housing within said compartment and wherein said fluid tank is of a U-shaped configuration adaptable for fitting about opposite sides of said rotor transmission housing so as to derive bi-directional lateral support from said housing.

9. The airborne fire suppression unit of claim 7 wherein the normal attitude of said aircraft during flight is such that said floor of said compartment is situated at an angle other than horizontal, and wherein said tank includes means for holding the bottom of said tank at an angle with respect to the floor of said compartment.

10. The airborne fire suppression unit of claim 9 wherein said tank is also equipped with interior baffle means for preventing the abrupt transfer of fluid from one portion of said tank to another upon momentary changes of attitude of said aircraft, so as to stabilize the location of the center of gravity of said fluid in said tank.

11. The airborne fire suppression unit of claim 7 including a first fluid conduit coupling said nozzle to said tank, said pump means having an inlet port and a discharge port interposed in said first conduit between said tank and said nozzle, a second fluid conduit independent of said first fluid conduit connecting said pump discharge port to said tank, and valve means interposed between said pump discharge port and both said nozzle and said second conduit respectively, said valve means having selective means for directing fluid from said pump discharge port alternatively either to said nozzle or to said second conduit so that, depending upon the selective actuation of said valve, said pump may direct fluid from said tank through said nozzle or recirculate said fluid to said tank.

12. The airborne fire suppression unit of claim 11 wherein said pump is powered by an internal combustion engine independent of the power system of said aircraft, said recirculation of said fluid through said tank permitting the continuous operation of said engine even though the supply of fluid to said nozzle be interrupted.

13. The airborne fire suppression unit of claim 12 including a pressure gauge mounted proximate said control means and coupled with said first conduit for measuring the pressure of the fluid delivered to said nozzle, and throttle control means adapted to be remotely coupled with said internal combustion engine for permitting power regulation of said engine by an operator stationed at said nozzle control means responsive to pressure indications of said pressure gauge.

14. The airborne fire suppression unit of claim 11 including a suction conduit adaptable to extend from said aircraft into a body of fluid and filler valve means for selectively either conducting or interrupting fluid flow from said suction conduit to said inlet port of said pump.

15. The airborne fire suppression unit of claim 14 wherein said filler valve means is interposed between said tank and said pump inlet port and includes means for selectively interrupting the flow of fluid from said tank to said pump while permitting flow from said suction conduit to said pump or, alternatively, permitting flow from said tank to said pump while interrupting flow from said suction conduit to said pump.

16. The airborne fire suppression unit of claim 14 wherein said suction conduit has a check valve mounted in its end opposite the end coupled to said pump inlet port, said check valve comprising means for permitting the flow of fluid through said suction conduit toward said pump but preventing the flow of fluid in a direction away from said pump.

17. The airborne fire suppression unit of claim 11 including a fire hose adaptable to extend from said aircraft to a location remote therefrom, and valve means for selectively coupling said fire hose to said pump discharge port.

18. In a helicopter having an interior compartment, a vertical rotor transmission housing therein and a floor forming the bottom of said compartment, a fire suppression unit comprising in combination:
   a. a U-shaped tank for holding a fire extinguishing fluid, said tank being mounted within said interior compartment about said rotor transmission housing and supported vertically by said compartment floor;
   b. an elongate boom assembly having a nozzle mounted thereon adaptable for coupling with said tank, said boom assembly including boom mounting means adjacent one end thereof for securing said boom assembly to said helicopter in a position so as to extend said nozzle laterally from said helicopter, said mounting means including means for permitting said boom assembly to reciprocate laterally about said mounting means;
   c. pivotal means mounting said nozzle to the extended end of said boom assembly for permitting said nozzle to reciprocate about said extended end of said boom assembly in a plane substantially perpendicular to the plane of said lateral reciprocation of said boom assembly;
   d. manual control means operable from within said interior compartment for regulating the lateral position of said boom assembly with respect to said helicopter and also for regulating the pivotal position of said nozzle with respect to said boom assembly;
   e. a fluid pump for causing a flow of said fire extinguishing fluid from said tank to said nozzle under pressure;
   f. a suction conduit coupled with the inlet side of said pump, said suction conduit being adaptable to depend downwardly from said helicopter into a body of fluid while said helicopter is in flight; and
   g. variable valve means coupling said pump with said nozzle, tank and suction conduit respectively for selectively directing pump flow either from said tank to said nozzle or, alternatively, from said suction conduit to said tank.

19. In an aircraft, a fire suppression unit comprising in combination:
   a. a tank for holding a fire extinguishing fluid;
   b. means for mounting said tank to said aircraft;
   c. a fluid dispensing nozzle coupled by a fluid conduit to said tank;
   d. an elongate boom assembly having a boom mounting means adjacent one end thereof adaptable for securing said boom assembly to said aircraft in a position so as to extend the other end of said boom assembly laterally from said aircraft, said mounting means including means for permitting said boom assembly to reciprocate laterally about said mounting means;
   e. means for mounting said nozzle to the extended end of said boom assembly including pivotal means for permitting said nozzle to reciprocate about said extended end of said boom assembly in a plane substantially perpendicular to the plane of said lateral reciprocation of said boom assembly;
   f. control means operable from within said aircraft for regulating the lateral position of said boom assembly with respect to said aircraft and also for regulating the pivotal position of said nozzle with respect to said boom assembly; and
   g. an operator's seat and means for securing said seat to said boom assembly so as to cause said seat to reciprocate laterally in unison with said boom assembly about said boom mounting means, said operator's seat being sufficiently proximate to said control means to allow an operator seated thereon to actuate said control means.

* * * * *